United States Patent [19]
Wille et al.

[11] Patent Number: 5,149,166
[45] Date of Patent: Sep. 22, 1992

[54] VEHICLE DOOR PROTECTOR

[75] Inventors: Dale A. Wille, 2648 Saratoga Dr., Waterloo, Iowa 50702; Douglas Sevey, Waterloo, Iowa

[73] Assignee: Dale A. Wille, Waterloo, Iowa

[21] Appl. No.: 797,536

[22] Filed: Nov. 25, 1991

[51] Int. Cl.⁵ .............................................. B60R 13/04
[52] U.S. Cl. .................................................... 293/128
[58] Field of Search ......................... 293/128; 280/770

[56] References Cited

U.S. PATENT DOCUMENTS

| | | | |
|---|---|---|---|
| 2,675,983 | 4/1954 | King | 248/226 |
| 2,889,165 | 6/1959 | Zientara | 293/1 |
| 3,131,960 | 5/1964 | Popp | 293/1 |
| 3,243,223 | 3/1966 | Haskell | 293/128 |
| 3,367,702 | 2/1968 | Sauer | 293/62 |
| 3,738,695 | 6/1973 | McBee | 293/128 |
| 3,882,574 | 5/1975 | Martinez | 24/73 |
| 4,002,363 | 1/1977 | James | 293/62 |
| 4,401,331 | 8/1983 | Ziner et al. | 293/128 |
| 4,708,380 | 11/1987 | Cruz | 293/128 |
| 4,810,013 | 3/1989 | Spears | 293/128 |
| 4,828,302 | 5/1989 | Marasigan, Jr. | 293/128 |
| 4,828,303 | 5/1989 | Soria | 293/128 |
| 4,879,543 | 11/1989 | Smith, Sr. | 340/473 |
| 5,071,181 | 12/1991 | Wagner | 293/128 |

Primary Examiner—Robert R. Song
Attorney, Agent, or Firm—Andrus, Sceales, Starke & Sawall

[57] ABSTRACT

A vehicle door protector assembly consists of a pair of telescoping rods and a pair of cushion members mounted to the rods. The cushion members define facing surfaces which engage each other when the door protector assembly is mounted to the door. One of the cushion members preferably includes a male projection, and the other includes a female recess adapted to receive the male projection. The cushion member in which the female recess is formed can be cut to length according to the length of the door, to accomodate the vehicle door protector assembly being mounted to a wide range of door lengths. The assembly is sold in the form of a kit, and the cushion member in which the female recess is formed is cut to length according to the door length, while leaving the female recess exposed.

21 Claims, 3 Drawing Sheets

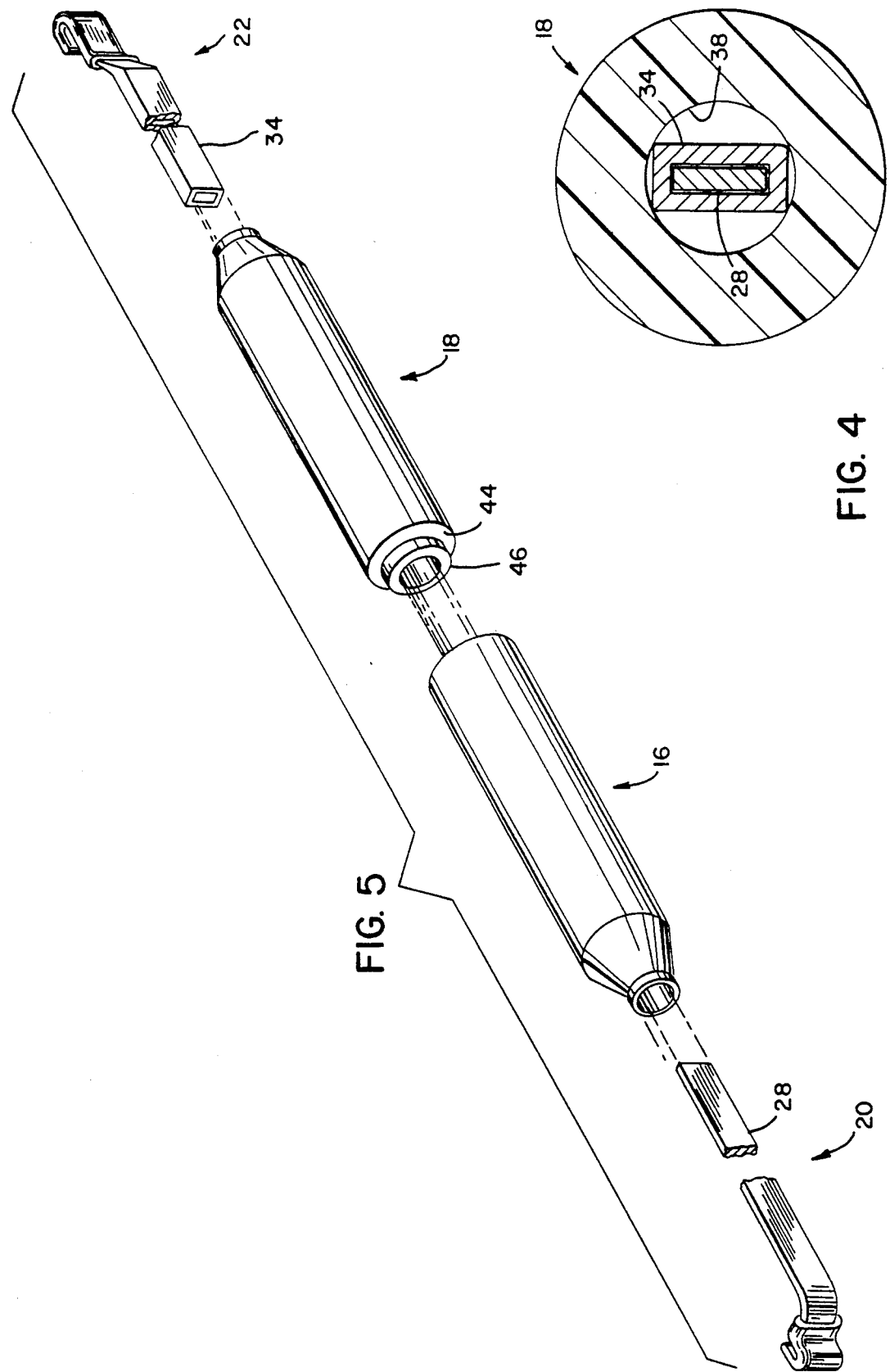

VEHICLE DOOR PROTECTOR

BACKGROUND AND SUMMARY

This invention relates to a door protector assembly for temporarily mounting to a vehicle door to protect the door from damage while the vehicle is parked.

When a vehicle is parked in a parking lot, it is not unusual for the edge of an adjacent vehicle's door, when it is being opened, to bump the door of the vehicle. This often results in paint smears, scratches or dents being left on the vehicle's door, which are unsightly and are difficult or expensive to repair. Vehicle manufacturers have attempted to address this problem by providing protective moldings on vehicle doors. However, such moldings often do not prevent the opening door of an adjacent vehicle from striking the panel of the vehicle door, such as when the outermost point of the opening door is located above or below the protective molding of the vehicle door.

Various temporary door protectors are known for mounting to a vehicle door to protect the door from being struck by an opening door when the vehicle is parked. Some such protectors are shown in Martinez U.S. Pat. No. 3,882,574; Zientara U.S. Pat. 2,889,165; Sauer U.S. Pat. No. 3,367,702; Cruz U.S. Pat. No. 4,708,380; Spears U.S. Pat. No. 4,810,013; Smith, Sr. U.S. Pat. No. 4,879,543; James U.S. Pat. No. 4,002,363; Ziner et al. U.S. Pat. No. 4,401,331; and Marasigan, Jr. U.S. Pat. No. 4,828,302.

It is an object of the present invention to provide a vehicle door protector which is extremely simple in its components, construction, operation and installation. It is a further object of the invention to provide a vehicle door protector which can be sold as a kit and in which certain components of the kit can be cut to size according to the length of the door to which the protector is to be mounted. It is a further object of the invention to provide a vehicle door protector which protrudes outwardly from the outer surface of the door a sufficient distance to prevent the edge of an opening door of an adjacent vehicle from striking the vehicle door, even when the outermost point of the opening door is located above or below the protector. Yet another object of the invention is to provide a vehicle door protector which is firmly secured to the door when the door is closed, and which is easily removable from the door when the door is opened.

In accordance with the invention, a vehicle door protector comprises a pair of elongated members, each of which has a hook at one of its ends. The elongated members are engagable with each other to form an elongated door mounting subassembly which defines a longitudinal spanning portion extending between first and second ends, with the hooks being located one at each end of the subassembly. The hooks are engagable with spaced edges of the door to mount the door mounting subassembly thereto. The elongated members are capable of movement relative to each other in a longitudinal direction, such that the spanning portion of the door mounting subassembly can be lengthened or shortened. Lengthening of the door mounting subassembly allows the hooks to be removed from the door, and shortening of the subassembly allows the hooks to be moved toward each other to engage the edges of the door. A pair of cushion members are adapted for mounting to the spanning portion of the door mounting subassembly. Each cushion member defines a longitudinal passage through which the spanning portion of the door mounting subassembly extends. The pair of cushion members include facing engaging surfaces, and encompass a majority of the length of the spanning portion when the door mounting subassembly is mounted to the door. The cushion members, in combination with the door mounting subassembly, are engaged by the outermost point of the opening door of an adjacent vehicle, to prevent the surface of the door to which the door protector is mounted from being struck by the opening door. In this manner, the cushion members absorb shocks to protect the door from being damaged by the opening door of an adjacent vehicle.

In a preferred form, the facing surface of one of the cushion members defines a male projection, and the facing surface of the other cushion member defines a female recess for receiving the male projection therein, to engage the cushion members with each other. The female recess extends throughout a majority of the length of the cushion member in which it is formed. In this manner, this cushion member can be cut to length according to the length of the door to which the door protector is mounted, while still leaving the female recess exposed to receive the male projection therein.

One of the elongated members defines an axially extending internal passage, and the other is received within the internal passage, such that the elongated members are telescopingly mounted to each other to shorten and lengthen the door mounting subassembly.

The invention further comprises a vehicle door protector kit and a method of mounting a door protector to the door of a vehicle, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a section view taken along line 4—4 of FIG. 3;

FIG. 5 is an exploded isometric view of the components of a vehicle door protector kit constructed according to the invention;

DETAILED DESCRIPTION OF THE INVENTION

Figure 1:
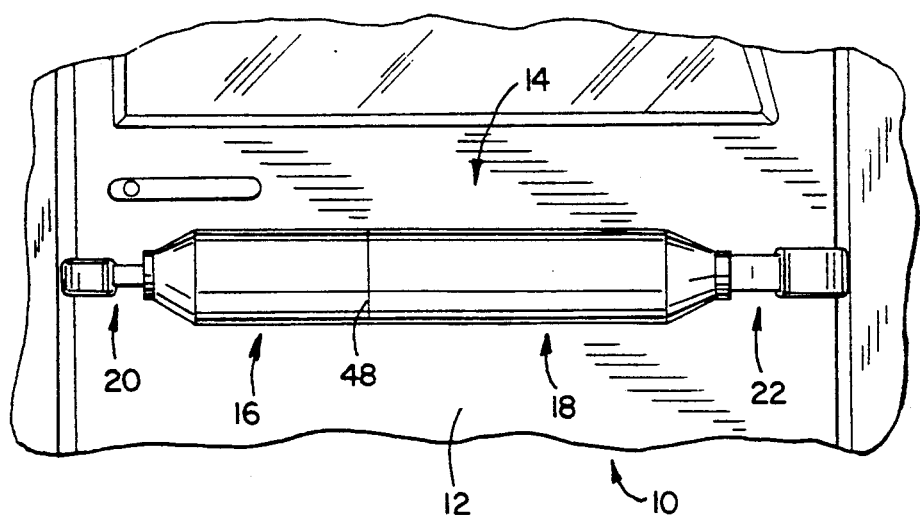
FIG. 1 is a partial side elevation view showing a vehicle door protector constructed according to the invention mounted to the door of a vehicle.

FIG. 1 generally illustrates an automobile door 10 having an outer panel 12, to which a vehicle door protector 14 is mounted. Door protector 14 is constructed according to the present invention, and generally consists of a pair of cushion members 16, 18 and a pair of rods 20, 22 which are engagable with the edges of door 10 and extend through cushion members 16, 18, in a manner to be explained, for mounting door protector 14 to door 10.

Figure 2:
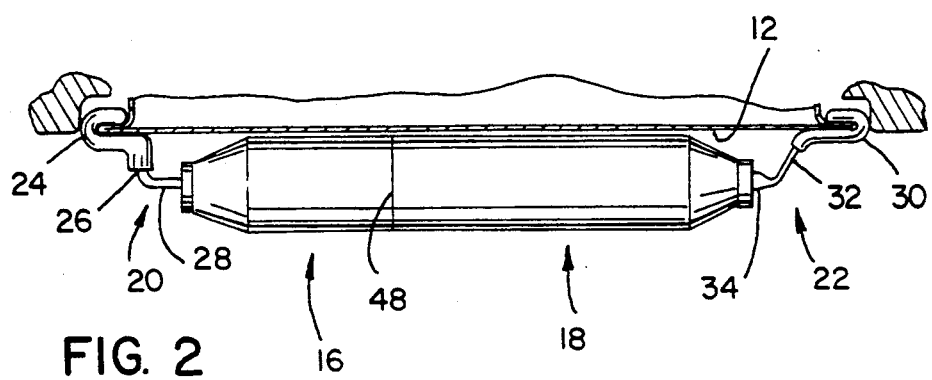
FIG. 2 is a top plan view, partially in section, showing the vehicle door protector of FIG. 1 as mounted to the vehicle door.
Figure 3:
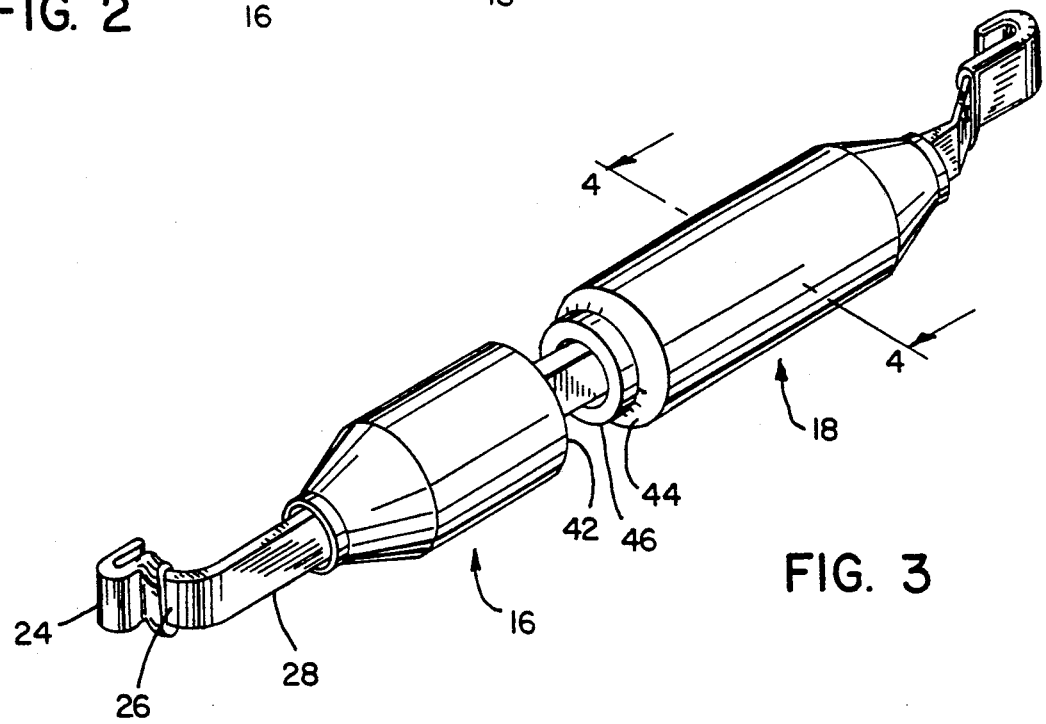
FIG. 3 is an isometric view of the vehicle door protector assembly of FIGS. 1 and 2, showing the telescoping elongated members and the cushion members moved apart from each other.

As shown in FIGS. 1-3, rod 20 defines a hook 24 at its end, a stand-off portion 26, and a straight portion 28 which is at a right angle to stand-off portion 26 and which extends parallel to the outer surface of door panel 12. The end of rod 20 is bent to shape to define hook 24 and stand-off portion 26, and is constructed tubular or bar stock. Hook 24 and the inner area of stand-off portion 26 are coated with a plastisol material to prevent the edge of door 10 from being scratched or marred by engagement of hook 24 with its edge.

Rod 22 is provided with a hook 30 at its end, a stand-off portion 32, and a straight portion 34 which extends parallel to the outer surface of door panel 12. Hook 30 and the inner area of stand-off portion 32 are also coated with a plastisol material to prevent hook 30 from scratching or marring door panel 12 when it is engaged with its edge. Rod 22 is formed of tubular stock and defines an internal passage, with its end portion being bent to define stand-off portion 32 and hook 30, in a manner as is known in the art.

While hooks 24 and 30 are shown formed at the ends of rods 20, 22, it is also contemplated that removable, interchangeable hooks could be mounted to the ends of rods 20, 22, to accommodate varying configurations of the edges of door 10.

Figure 6:
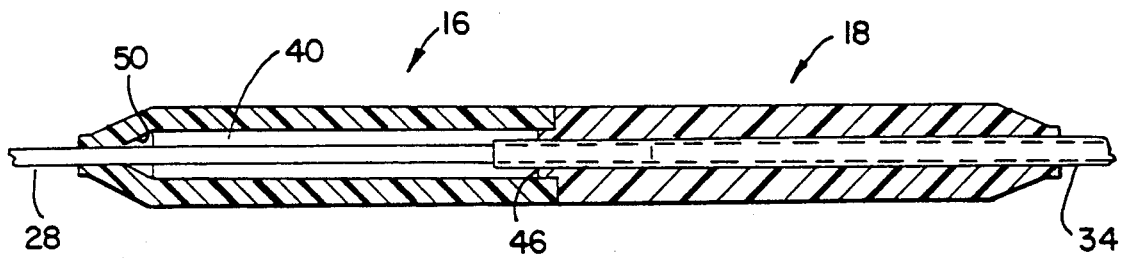
FIG. 6 is a partial longitudinal section view showing the internal arrangement of the kit components of FIG. 5 when mounted to each other.
Figure 7:
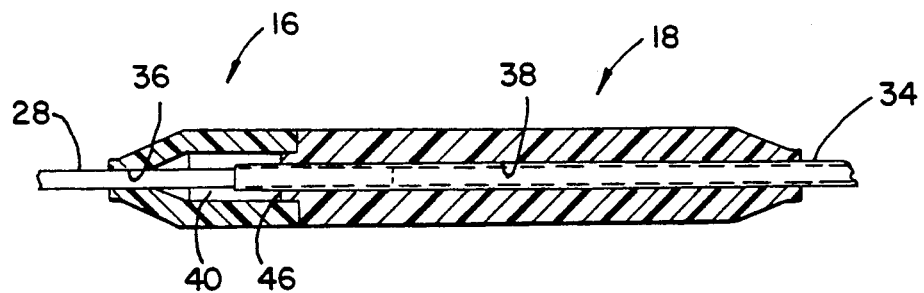
FIG. 7 is a view similar to FIG. 6, showing the door protector assembly with one of the cushion members cut to length to accommodate mounting to a relatively short vehicle door, as in FIGS. 1-3.

Referring briefly to FIGS. 4, 6 and 7, straight portion 28 of rod 20 is adapted to be received within the internal passage defined by straight portion 34 of rod 22. In this manner, rods 20 and 22 define a door mounting subassembly which includes a spanning portion defined by straight portions 28, 34 of rods 20, 22, respectively. The length of the spanning portion can be shortened or increased by telescoping movement of straight portions 28, 34 relative to each other, to release and engage hooks 24, 30 from and to the edges of door 10. FIG. 4 shows the manner in which straight portion 28 of rod 20 is received within straight portion 34 of rod 22.

Cushion member 16 defines a longitudinal internal passage within which straight portion 28 of rod 20 is received. Similarly, cushion member 18 defines a longitudinal internal passage within which straight portion 34 of rod 22 is received. Referring to FIG. 7, the longitudinal passage of cushion member 16 is shown at 36, and the longitudinal passage in cushion member 18 is shown at 38.

Referring to FIG. 4, longitudinal passage 38 formed in cushion member 18 is substantially circular in cross section. Straight portion 34 of rod 22 defines a substantially rectangular cross section, with the outer corners of straight portion 34 engaging the wall defining passage 38 so as to securely mount cushion member 18 to rod 22. As shown in FIGS. 6 and 7, straight portion 34 of rod 22 extends beyond the end of male projection 46 when cushion member 18 is mounted to rod 22.

Longitudinal passage 36 in cushion member 16 also is substantially circular in cross section, and straight portion 28 of rod 20 defines a rectangular cross section having outer corners which engage the wall defining passage 36 to secure cushion member 16 to rod 20.

Cushion member 16 further defines a longitudinally extending female recess 40 into which its longitudinal passage 36 opens.

Cushion members 16, 18 may be blow-molded hollow plastic members, or, as shown, formed of a skinned foam material according to known techniques.

FIGS. 5 and 6 illustrate the original length of cushion member 16 as it is supplied with a kit, according to the invention. FIGS. 1-3 and 7 show cushion member 16 cut to length according to the overall length of door 10, to which door protector assembly 14 is adapted to be mounted.

Referring to FIGS. 1-3, cushion members 16, 18 define facing surfaces 42, 44, respectively. Female recess 40 of cushion member 16 opens onto its facing surface 42, whereas facing surface 44 of cushion member 18 is provided with an outwardly extending male projection 46. When cushion members 16, 18 are mounted to the spanning portion defined by straight portions 28, 34, and hooks 24, 30 are moved into engagement with the edges of door 10, facing surfaces 42, 44 of cushion members 16, 18 engage each other to define a joint 48 (FIGS. 1, 2). Male projection 46 is received into female recess 40, as shown in FIG. 7, to engage cushion members 16, 18 with each other.

As shown in FIG. 6, female recess 40 extends throughout a majority of the length of cushion member 16 as it is originally supplied, defining a tapered end 50 leading into passage 36.

As noted previously, door protector assembly 14 is supplied in the form of a kit having the components illustrated in FIG. 4. The kit consists of rods 20, 22 and cushion members 16, 18. In the kit, cushion members 16, 18 have a length of approximately 32 inches, and rods 20, 22 have an overall length of approximately 48 inches. When door protector assembly 14 is to be mounted to a long door, such as a door having a length in the vicinity of 68 inches, it is not necessary to cut cushion member 16, and the components of the kit will be installed in a manner as shown in FIG. 6. In this installation, cushion member 16 has its original length, as do rods 20 and 22. Door protector assembly 14 is mounted to a vehicle door when the door is opened by first engaging hook 30 of rod 22 with the inner edge of the door, and then engaging hook 24 of rod 20 with the outer edge of the door. Straight portions 28, 34 of rods 20, 22 respectively are moved together to move hooks 24, 30 onto the door edges. The door is then closed, and hooks 24, 30 cannot be removed from the door while the door remains closed. As shown in FIG. 2, the vehicle body panels located adjacent each edge of the door prevent hooks 24, 30 from being moved out of engagement with the door edges.

To remove door protector assembly 14, the door is opened and rod 20 is telescopingly moved outwardly relative to rod 22, to disengage hook 24 from the edge of the door. Once this is done, hook 30 can be disengaged from the inner edge of the door, by sliding hook 30 upwardly or downwardly on the door edge to obtain sufficient clearance to provide removal of hook 30.

When door protector 14 is to be installed on a shorter door, such as one having a length in the range of 36 inches to 60 inches, straight portion 28 of rod 20 is cut according to the door size to provide engagement of at least 9 inches within the internal passage defined by straight portion 34 of rod 22, when hooks 24 and 30 are engaged with the edges of the door. Cushion member 16 is cut to length according to the door size, such as shown in FIGS. 1-3 and 7. When this occurs, the cut end of cushion member 16 defines its facing surface 42, onto which female recess 40 opens. With the length of female recess 40 as shown, a wide range of door sizes can be accommodated by providing a wide range to the possible length of cushion member 16. Once cushion member 16 and rod 20 are cut to length according to the door size, door protector assembly 14 is mounted to and removed from the door in the same manner as described previously.

Various alternatives and embodiments are contemplated as being within the scope of the following claims particularly pointing out and distinctly claiming the subject matter regarded as the invention.

We Claim:

1. A vehicle door protector, comprising:
   a first elongated member having a hook at one of its ends;
   a second elongated member having a hook at one of its ends;
   wherein the first and second members are engagable with each other to form an elongated door mounting subassembly defining a longitudinal spanning portion extending between first and second ends, wherein the hooks are located one at each end of the door mounting subassembly and are engagable with spaced edges of a door to mount the door mounting subassembly thereto, and wherein the first and second members are capable of movement relative to each other in a longitudinal direction such that the spanning portion of the door mounting subassembly can be lengthened to allow the hooks to be removed from the edges of the door and shortened to allow the hooks to be moved toward each other to engage the edges of the door; and
   a pair of cushion members each defining a longitudinal passage through which the spanning portion of the door mounting subassembly extends, wherein the pair of cushion members include facing engaging surfaces and encompass a majority of the length of the spanning portion, and wherein the cushion members in combination with the door mounting subassembly are capable of absorbing shocks to protect the door from being subjected to shocks which otherwise would cause damage to the door.

2. The vehicle door protector of claim 1, wherein the first elongated member defines an axially extending internal passage, and wherein the second elongated member is telescopingly mounted within the internal passage of the first elongated member for movably mounting the second member to the first member.

3. The vehicle door protector of claim 1, wherein each hook is coated with a protective material to protect the door from being scratched by the hook where it engages an edge of the door.

4. The vehicle door protector of claim 1, wherein the pair of cushion members comprise a first cushion member defining a male projection at its facing surface, and a second cushion member defining a female recess at its facing surface for receiving the male projection of the first cushion member.

5. The vehicle door protector of claim 4, wherein the female recess defined by the second cushion member extends throughout a majority of the length of the second cushion member, whereby the second cushion member can be cut to reduce its length, to accommodate varying door lengths while leaving the female recess exposed to receive the male projection defined by the first cushion member.

6. The vehicle door protector of claim 4, wherein the first elongated member defines an axially extending internal passage, and wherein the second elongated member is telescopingly mounted within the internal passage of the first elongated member for movably mounting the second member to the first member, and wherein the passage in the first cushion member receives the first elongated member, and wherein the passage in the second cushion member opens into the female recess and receives the second elongated member.

7. The vehicle door protector of claim 6, wherein the second cushion member defines a first end and a second end, wherein the first end is provided with a tapered portion and the second end defines the facing surface of the second cushion member, and wherein the female recess opens onto the second end and extends throughout a majority of the length of the second cushion member, to allow the second cushion member to be cut to length at any point along the length of the female recess while leaving the female recess exposed, to provide a wide range of lengths to which the second cushion member can be cut.

8. The vehicle door protector of claim 6, wherein the first cushion member defines a first end and a second end, wherein the second end defines the facing surface of the first cushion member, and wherein the passage in the first cushion member extends between its first and second ends and defines a cross-section providing a close fit of the first member in engagement with the passage.

9. A vehicle door protector, comprising:
   a first elongated member having a hook at one of its ends and defining an axially extending internal passage;
   a second elongated member having a hook at one of its ends;
   wherein the second elongated member is telescopingly mounted within the internal passage of the first member for movably mounting the second member to the first member, wherein the first and second members form an elongated door mounting subassembly defining a longitudinal spanning portion extending between first and second ends, wherein the hooks are located one at each end of the door mounting subassembly and are engagable with and removable from spaced edges of the door by moving the first and second members relative to each other to shorten and lengthen the spanning portion; and
   a cushion defining a longitudinal passage through which the longitudinal spanning portion of the door mounting subassembly extends, wherein the cushion encompasses a majority of the length of the spanning portion and is capable of absorbing shocks to protect the door from being subjected to shocks which otherwise would cause damage to the door.

10. The vehicle door protector of claim 9, wherein the cushion comprises a first cushion member and a second cushion member, wherein the first cushion member defines a longitudinal internal passage for receiving the first elongated member, and the second cushion member defines a longitudinal internal passage for receiving the second elongated member.

11. The vehicle door protector of claim 10, wherein the first and second cushion members each define facing surfaces which engage each other when mounted to the longitudinal spanning portion of the door mounting subassembly, wherein the facing surfaces of one of the first and second cushion members includes a male projection and the facing surface of the other of the first and second cushion members includes a female recess, wherein the male projection is received within the female recess to engage the first and second cushion members together.

12. The vehicle door protector of claim 11, wherein the female recess extends throughout a majority of the length of the cushion member, whereby the cushion member can be cut to a desired length at any location along the length of the female recess, to accommodate varying door lengths while leaving the female recess exposed.

13. A vehicle door protector kit, comprising:
a first elongated member having a hook at one of its ends;
a second elongated member having a hook at one of its ends;
wherein the first and second elongated members are engagable with each other to form an elongated door mounting subassembly defining a longitudinal spanning portion extending between the first and second ends, wherein the hooks are located one at each end of the door mounting subassembly and are engagable with spaced edges of the door to mount the door mounting subassembly thereto;
a first cushion member defining a first end and a second end, the first cushion member having a longitudinal passage extending between its ends adapted to receive one of the elongated members therein, wherein the second end of the first cushion member defines a male projection;
a second cushion member defining a first end and a second end, the second cushion member having a passage adapted to receive one of the elongated members therein, wherein the second cushion member has a female recess opening onto its second end extending throughout a majority of the length of the second cushion member, whereby the second cushion member can be cut along its length to accommodate varying door lengths while leaving the female recess exposed to receive the male projection when the first and second cushion members are mounted to the spanning portion of the door mounting subassembly, by means of the first and second members extending through the passages of the first and second cushion members, respectively.

14. The vehicle door protector kit of claim 13, wherein the first and second elongated members are capable of movement relative to each other in a longitudinal direction such that the spanning portion of the door mounting subassembly can be lengthened to allow the hooks to be removed from the edges of the door, and shortened to allow the hooks to be moved toward each other to engage the edges of the door.

15. The vehicle door protector kit of claim 14, wherein one of the first and second elongated members is adapted to be cut to length to accommodate mounting of the door mounting subassembly to accommodate varying door lengths.

16. The vehicle door protector kit of claim 13, wherein the second cushion member defines a first end and a second end, wherein the second end defines a facing surface of the second cushion member and wherein the female recess opens onto the second end.

17. The vehicle door protector kit of claim 13, wherein the first cushion member defines a first end and a second end, wherein the second end defines a facing surface of the first cushion member, and wherein the passage through the first cushion member extends between its first and second ends, and wherein the passage defines a cross-section providing a close fit of one of the first and second elongated members in engagement with the passage.

18. A method of mounting a vehicle door protector assembly to a vehicle door, comprising the steps of:
providing a first elongated member having structure at one of its ends for engaging an edge of the door;
providing a second elongated member having structure at one of its ends for engaging an edge of the door;
providing a first cushion member defining a first end and a second end, the first cushion member having a longitudinal passage extending between its first and second ends;
providing a second cushion member defining a first end and a second end, the second cushion member having a longitudinal passage extending between its first and second ends;
cutting one of the cushion members to length according to the length of the door to which the assembly is to be mounted;
inserting one of the elongated members through the passage in the first cushion member and inserting the other of the elongated members through the passage in the second cushion member;
engaging the elongated members with each other such that the elongated members are movable relative to each other to lengthen and shorten the overall length of the assembly, wherein the elongated members define a longitudinal spanning portion to which the first and second cushion members are mounted; and
engaging spaced edges of the door with the door engaging structure provided at the ends of the elongated members to mount the vehicle door protector assembly to the door.

19. The method of claim 18, further comprising the step of engaging facing surfaces of the first and second cushion members with each other on the spanning portion of the door mounting subassembly.

20. The method of claim 19, wherein the first cushion member is provided with a male projection at its facing surface, and wherein the second cushion member is provided with a female recess at its facing surface, wherein the second cushion member comprises the cushion member which is cut to length according to the length of the vehicle door.

21. The method of claim 20, wherein the second cushion member defines a female recess extending throughout a majority of its length, whereby the female recess opens onto the facing surface of the second cushion member when the second cushion member is cut according to the length of the vehicle door, to accommodate receiving the male projection provided on the facing surface of the first cushion member when the first and second cushion members are engaged with each other on the spanning portion of the door mounting subassembly.

* * * * *